(No Model.)

T. B. HOWE.
JAR FASTENER.

No. 387,683.        Patented Aug. 14, 1888.

Witnesses.
Chas. R. Burr,
Thomas Durant.

Inventor.
Thomas B. Howe.
by Church & Church
his Attorneys.

UNITED STATES PATENT OFFICE.

THOMAS B. HOWE, OF SCRANTON, PENNSYLVANIA, ASSIGNOR OF TWO-THIRDS TO M. A. GOODWIN AND G. A. CLEARWATER, BOTH OF SAME PLACE.

JAR-FASTENER.

SPECIFICATION forming part of Letters Patent No. 387,683, dated August 14, 1888.

Application filed June 15, 1888. Serial No. 277,185. (No model.)

*To all whom it may concern:*

Be it known that I, THOMAS B. HOWE, of Scranton, in the county of Lackawanna and State of Pennsylvania, have invented certain new and useful Improvements in Jar-Fasteners; and I do hereby declare the following to be a full, clear, and exact description of the same, reference being had to the accompanying drawings, forming a part of this specification, and to the figures and letters of reference marked thereon.

My present invention relates to certain improvements in covers for jars and bottles, and particularly large-mouthed jars—such as are employed in canning fruits or for containing milk, to enable the same to be handled conveniently—the object being to produce a simple and efficient device, easily constructed and manipulated, and not liable to get out of order; to which ends the invention consists in certain novel features of construction and combinations and arrangements of parts, to be hereinafter described, and pointed out particularly in the claims at the end of this specification.

Figure 1:
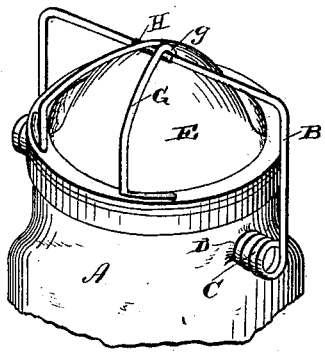
Figure 2:
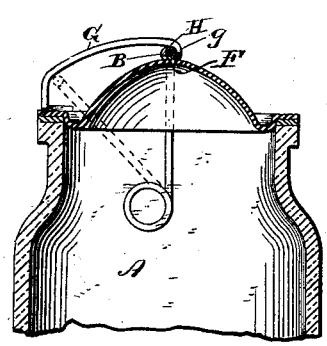
Figure 3:
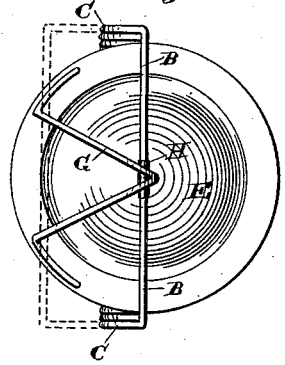
Figure 4:
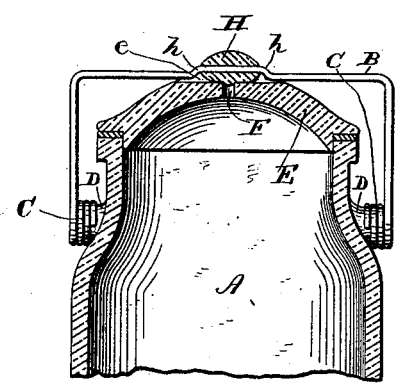
Figure 5:
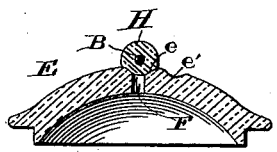

In the accompanying drawings, Figure 1 is a perspective view of a jar having my invention applied thereto. Fig. 2 is a cross-sectional view. Fig. 3 is a top plan view; Fig. 4, a sectional view of a modified form of cover; Fig. 5, a sectional view taken at right angles to Fig. 4, with the bail in locked position.

Similar letters of reference in the several figures indicate the same parts.

The bail B, passing over the top of the jar A, is formed as in my prior patent, No. 378,685, dated February 28, 1888—that is to say, the bearing therefor is formed by bending the ends of the bail into close coils, C, with a comparatively large diameter, in order to obtain the advantage of a large bearing-surface, as explained in said patent; but instead of forming a recess in the side of the jar for the reception of the coils, as in the former instance, I provide trunnions or lugs D on the side of the jar, over which the coils are sprung, some of the coils, if desired, extending beyond the ends of the trunnions to afford the necessary spring.

The cover E is preferably formed of sheet metal, as shown, although it is obvious that other materials—such as glass, as in Fig. 4—may be employed to advantage, suitable surfaces being provided to engage the edges of the jar or the interposed packing, and a depression, $e$, being formed at the top, in which the bail rests when in locked position. A perforation, F, is made through the cover in the depression $e$ at the top, which is covered and hermetically sealed by the bail when locked. Such a construction is clearly shown in Figs. 4 and 5, in which a glass cover is shown with two depressions, $e$ $e'$, in the top, the latter to retain the cover closed while air is allowed to escape through the orifice, and the former to retain the bail over the aperture. The bail is in this instance, and in the other, if desired, bent up at the center, forming shoulders $h$ $h$, and a rubber roller, or an elliptical-shaped piece of rubber, H, is placed on such bent-up portion in position to roll up the inclined surface of the top when locking the jar, and also serving as a most efficient seal for the vent.

Secured to one side of the cover and extending over to or beyond the center is a wire or wires, G, preferably only one, with its ends secured to the side of the cover at points somewhat separated, its central part being bent over and down, the angle resting on the cover slightly beyond the center, a slight inward turn being given the angle at $g$ to prevent the ready escape of the bail, which is confined between the wire G and the cover.

The ends only of the wire G are secured to the cover, the portion at the center being loose to permit the bail to be inserted or removed by lifting the wire, the spring in the same holding the center part in intimate contact with the cover and preventing the accidental escape of the bail.

In operation, when the bail is thrown back, as shown in dotted lines, Fig. 2, it strikes the wire G and lifts the cover off, allowing it to swing freely down to the side of the jar. The cover is properly positioned in being closed by the separated ends of wire G, as will be readily understood from Fig. 3.

It is obvious that this form of fastening may be applied to small-mouthed bottles—such as beer-bottles—by simply reducing the size of the parts, no other material change being necessary.

Having thus described my invention, what I claim as new is—

1. The combination, with the cover having the inclined surface and vent-hole, of the bail pivoted to the side of the jar and having the rubber roller thereon for closing the vent when in locked position, substantially as described.

2. The combination, with the cover having the inclined surface and the vent-hole, of the bail pivoted to the side of the jar, having its central portion bent up, forming shoulders, and the rubber roller on the bail between the shoulders, adapted to cover the vent when in locked position, substantially as described.

3. The combination, with the bail pivoted to the side of the jar and the cover having the inclined surface up which the bail rides to lock the cover, of the wire bridging the bail to secure the cover thereto fastened to the cover at the edge, but free at the center, substantially as described.

4. The combination, with the bail pivoted to the side of the jar and the cover having the inclined surface, up which the bail rides to lock the cover, of the wire bridging the bail to secure the cover thereto, fastened at the ends to the side of the cover at separate points, but free at the center, said central part being bent slightly inward to prevent the ready escape of the bail, as set forth.

5. The combination, with the cover having the inclined surface up which the bail rides to lock the same, of the bail formed into relatively large coils at the ends, surrounding and taking their bearings on trunnions at the side of the jar, substantially as described.

6. The combination, with the cover, of the bail for locking the same formed into the relatively large coils at the ends and trunnions at the sides of the jar, on which the said coils take the bearings, substantially as described.

THOMAS B. HOWE.

Witnesses:
PERCIVAL J. MORRIS,
J. ELLIOT ROSS.